United States Patent
Grehn

(10) Patent No.: US 6,655,879 B2
(45) Date of Patent: Dec. 2, 2003

(54) TOOL FOR CHIP REMOVING MACHINING HAVING A WEDGE-ACTUATED INSERT ADJUSTMENT MECHANISM

(75) Inventor: Jan Grehn, Gimo (SE)

(73) Assignee: Sandvik AB, Sandviken (SE)

( * ) Notice: Subject to any disclaimer, the term of this patent is extended or adjusted under 35 U.S.C. 154(b) by 0 days.

(21) Appl. No.: 10/305,009

(22) Filed: Nov. 27, 2002

(65) Prior Publication Data

US 2003/0123938 A1 Jul. 3, 2003

(30) Foreign Application Priority Data

Nov. 27, 2001 (SE) .............................. 0103951

(51) Int. Cl.⁷ ................................. B23C 5/24
(52) U.S. Cl. ....................................... 407/44
(58) Field of Search ..................... 407/36, 41, 44, 407/53, 87, 92, 95, 103, 115; 408/146, 153, 713

(56) References Cited

U.S. PATENT DOCUMENTS

| | | | | |
|---|---|---|---|---|
| 3,726,352 A | * | 4/1973 | Olov Roos | ................. 175/413 |
| 3,785,746 A | | 1/1974 | Wolf et al. | |
| 3,854,511 A | * | 12/1974 | Maier | .......................... 144/230 |
| 4,024,615 A | * | 5/1977 | Lieser | ...................... 29/105 R |
| 5,391,023 A | | 2/1995 | Basteck | |
| 5,658,100 A | * | 8/1997 | Deiss et al. | .................... 407/53 |
| 6,056,484 A | | 5/2000 | Mitchell et al. | |
| 6,231,276 B1 | | 5/2001 | Müller | |
| 2002/0053266 A1 | | 5/2002 | Enquist | |

FOREIGN PATENT DOCUMENTS

| | | |
|---|---|---|
| DE | 35 33 125 | 3/1987 |
| DE | 39 36 243 | 5/1991 |
| DE | 92 04 587 U | 10/1998 |
| WO | 98/43766 | 10/1998 |

* cited by examiner

Primary Examiner—Willmon Fridie, Jr.
(74) Attorney, Agent, or Firm—Burns, Doane, Swecker & Mathis, LLP

(57) ABSTRACT

A cutting tool has an adjusting mechanism for a cutting insert. The adjusting mechanism includes a wedge element in the form of a conical head on a set screw, as well as a sleeve mountable in the base body of the tool. Two jaws are included in the sleeve, a first one of which is wider than the second and has two rearwardly directed pressure surfaces for cooperation with two secondary support surfaces in the base body. A front surface on the first jaw is always kept pressed against a rear surface on the cutting insert, whereby the cutting insert is kept in a basic position. When the cutting insert is to be finely-adjusted, the second jaw is activated by tightening the set screw, whereby the second jaw supports itself against the base body, and then the first jaw is set in motion forwards in order to push out the cutting insert axially in fine steps.

11 Claims, 6 Drawing Sheets

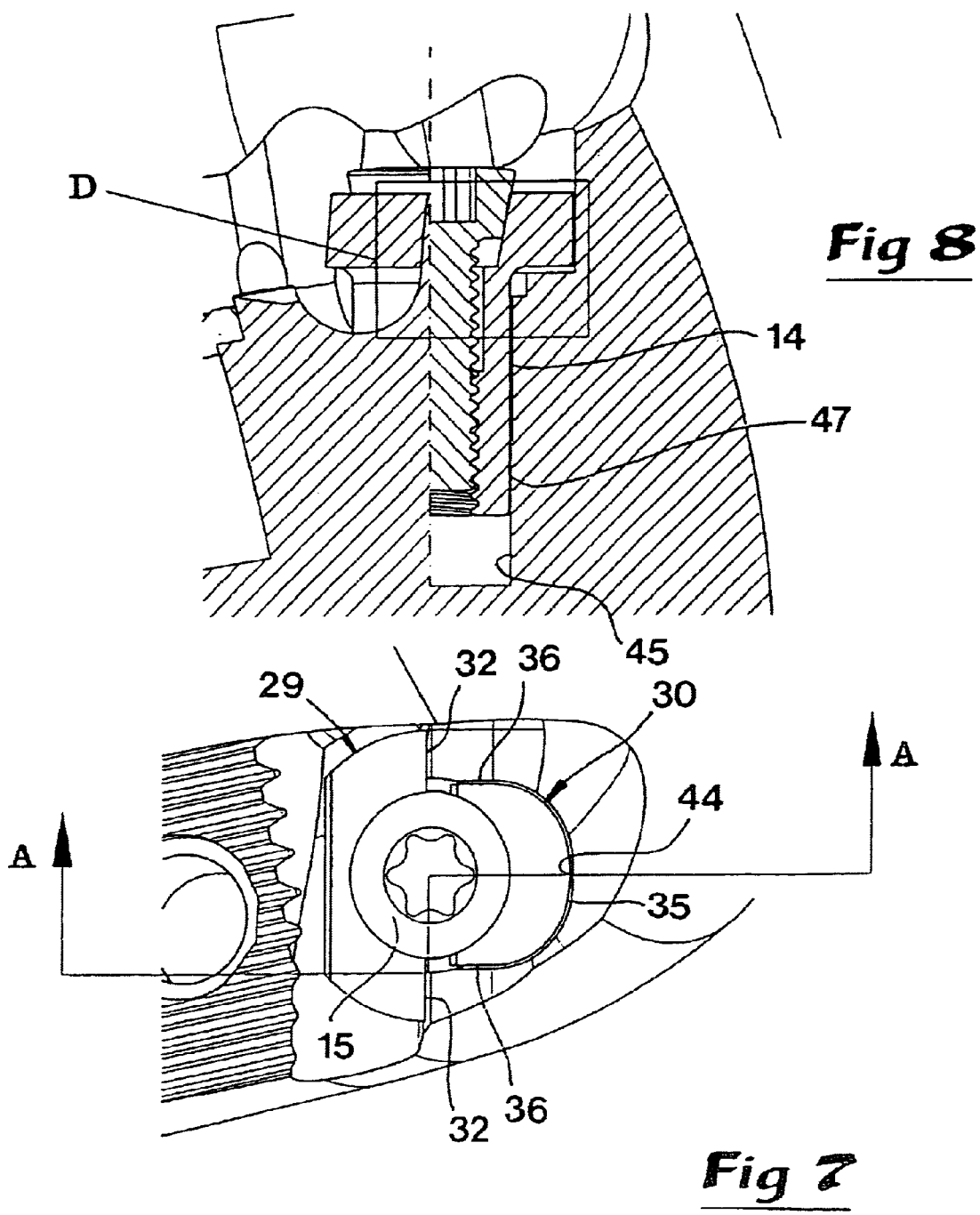

TOOL FOR CHIP REMOVING MACHINING HAVING A WEDGE-ACTUATED INSERT ADJUSTMENT MECHANISM

This application is based on and claims priority under 37 U.S.C. §119 with respect to patent application Ser. No. 0103951-0 filed in Sweden on Nov. 27, 2001, the entire content of which is incorporated herein by reference.

TECHNICAL FIELD OF THE INVENTION

This invention relates to a tool intended for chip removing or chip forming machining that comprises a base body and an insert seat for a replaceable cutting insert, which is adjustable by means of an adjusting mechanism located adjacent to the insert seat. The adjusting mechanism includes two jaws, a first one of which can press with a front surface against a rear surface on the cutting insert, and the second of which can press with a rearwardly directed pressure surface against at least one fixed support surface on the base body. Between the jaws a wedge member acts, that has the purpose of separating the jaws, if required, by being driven in between them so that the second jaw is pressed against the support surface at the same time as the first jaw presses out the cutting insert in the forward direction.

PRIOR ART

A cutting tool having an adjusting mechanism of the above generally mentioned kind is previously known from WO 98/43766. In said known tool, the adjusting mechanism includes an inside sleeve having a female thread for a set screw, as well as an outside sleeve, which is formed with two axial, diametrically opposed slots that separate two elastically deflectable segments in an upper part of the outside sleeve. In said segments, two jaws are formed, viz. a first essentially block-shaped jaw having the same width as the outer diameter of the outside sleeve and having a plane front surface that is pressed against a rear surface of the cutting insert, while a second jaw consists of a semi-circular, thickened wall portion, the width of which likewise corresponds to the outer diameter of the outside sleeve. The outside or the envelope surface of said thickened wall portion is pressed against a likewise semi-circular, fixed support surface recessed in the base body. A conical head on the set screw of the mechanism serves as a wedge member for separating the jaws in connection with fine-adjustment of the position of a cutting insert. Said conical screw head is in engagement with a similar conical space formed internally in the upper part of the outside sleeve, which space is delimited by two conical shaped partial surfaces on the inside of the segments. By screwing the set screw different distances into the female thread of the inside sleeve, the jaws are caused to separate by different distances from each other, whereby a cutting insert supporting against the block-shaped jaw of the adjusting mechanism is caused to assume different settings. By suitable choices of different parameters—primarily the conicity of the screw head and the pitch of the threads—adjustment of the cutting insert may be effected with a fairly high dimensional accuracy, e.g. down to 1/100 mm.

However, a disadvantage of the adjusting mechanism included in the tool according to Publication WO 98/43766 is that the forces being applied to the cutting insert are transferred to the single support surface in a continuous train of forces through initially the block-shaped first jaw, and then the head of the set screw and finally the second jaw whose envelope surface abuts against the support surface in the base body. This means, among other things, that all said components are continuously exposed to varying stresses, which may impair the setting accuracy. Another detrimental consequence is that each cutting insert must be adjusted individually by manipulation of the set screw because the position of the cutting insert is always dependent on the state of the axial tightening of the set screw. In many practical applications for different tools, such as milling cutters, for attainment of a satisfactory machining result it is sufficient to set the different cutting inserts of the tool in a basic position, e.g., with the accuracy 1–2/100 mm, but then for other applications it is desirable to be able to set the cutting inserts with a closer accuracy, e.g. 1–2/1000 mm. It is an intricate and time-consuming task to then individually set all the cutting inserts on a milling cutter, by manipulation of the set screws, as is required in WO 98/43766.

AIMS AND FEATURES OF THE INVENTION

The present invention aims at obviating the above-mentioned disadvantages of the previously known cutting tool and the adjusting mechanism thereof by providing a tool having an improved adjusting mechanism. Therefore, a primary object of the invention is to provide a tool having an adjusting mechanism which is normally exposed to only minimal stresses from the cutting insert, and which if required enables fine adjustment of the cutting insert to an extraordinarily good dimensional accuracy. It is also an aim to provide a tool having an adjusting mechanism built up of few components that are structurally uncomplicated as well as simple to manufacture.

According to the invention, at least the primary aim is attained by a tool for chip removing machining which comprises a base body and an insert-adjusting mechanism disposed on the base body. The base body presents an insert seat which is adapted to receive a cutting insert. The base body includes first and second fixed support surface structures disposed adjacent to the seat. The insert-adjusting mechanism is disposed adjacent to the seat and includes first and second jaws and a movable wedge member positioned between the jaws for spreading the jaws away from one another by a selected distance. The first jaw includes a front surface facing in a first direction toward the seat, and a first pressure surface structure facing in a second direction generally opposite the first direction. The front surface is adapted to engage a cutting insert and define a support position therefor. The second jaw includes a second pressure surface structure facing generally in the second direction. The jaws are positionable in a first position wherein the first pressure surface structure engages the first support surface structure, and the second pressure surface structure is spaced from the second support surface structure, wherein the front surface of the first jaw defines a basic support position adjacent to the seat. The jaws are positionable in a second position by being spread apart by the wedge member, wherein the second pressure surface structure engages the second fixed support surface structure and displaces the first jaw in the first direction, wherein the front surface of the first jaw defines an adjusted support position.

The invention also pertains to a method utilizing the tool.

BRIEF DESCRIPTION OF THE DRAWINGS

In the drawings:

FIG. 7 is a planar view from above of the adjusting mechanism in a mounted state, FIG. 8 is a section A—A in FIG. 7.

DESCRIPTION OF A PREFERRED EMBODIMENT OF THE INVENTION

Figure 1:
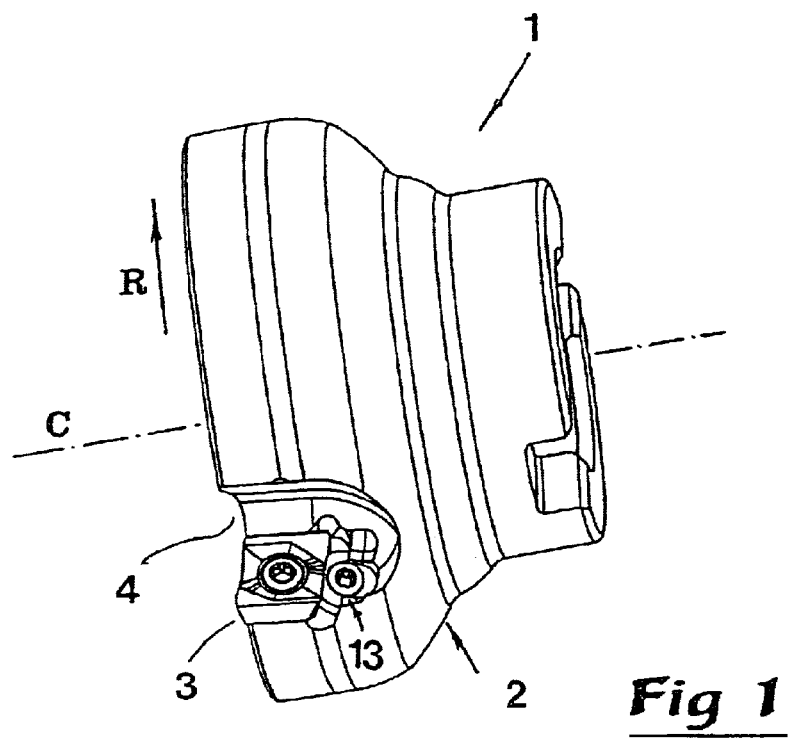
FIG. 1 is a perspective view of a cutting tool in the form of a milling tool, which in a simplified way is shown having only one cutting insert together with an adjusting mechanism therefor.

In FIG. 1, numeral 1 generally designates a rotatable cutting tool in the form of a milling cutter, which preferably—though not necessarily—is intended for chip removing machining of metallic workpieces. The tool includes a base body 2 having a rotationally symmetrical basic shape as well as a plurality of replaceable cutting inserts 3, only one of which is shown in FIG. 1. The base body 2 is rotatable around a center axis C, more precisely in the direction of rotation R. The cutting insert 3 is placed in a chip pocket 4 that opens in the periphery of the base body.

Figure 2:
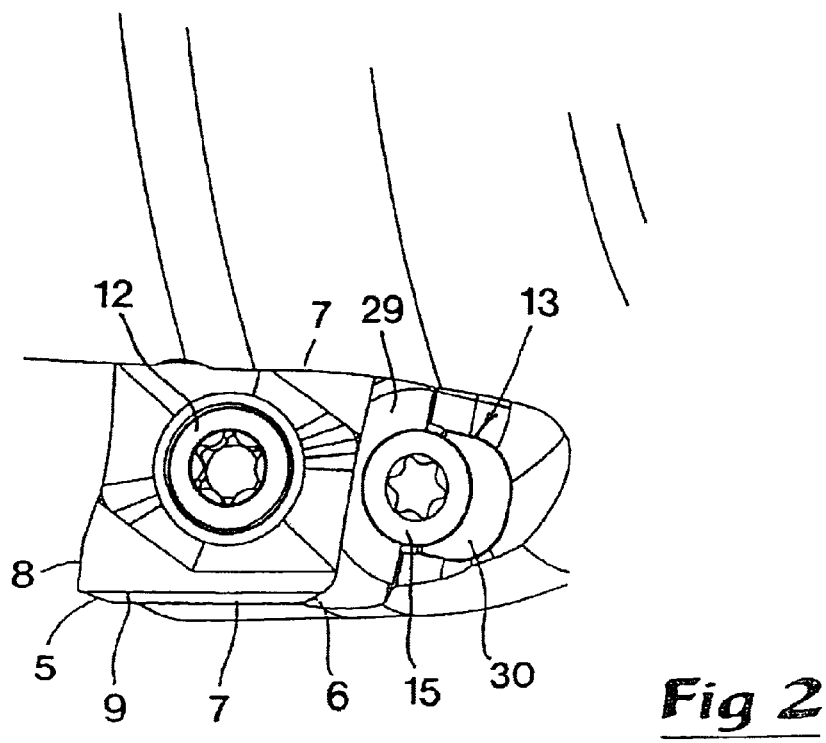
FIG. 2 is an enlarged perspective view of the cutting insert and the adjusting mechanism regarded in approximately the same view as in FIG. 1.

In the detailed enlargement in FIG. 2 it is shown how the cutting insert 3 includes a front end surface 5, an opposite rear end surface 6 as well as two side surfaces 7 disposed therebetween. Cutting edges 8, 9 are formed adjacent to said surfaces, of which a front one 8 protrudes a distance in front of the planar, front end surfaces of the base body 2, while one of two side cutting edges 9 protrudes a distance from the envelope surface of the base body.

Figure 3:
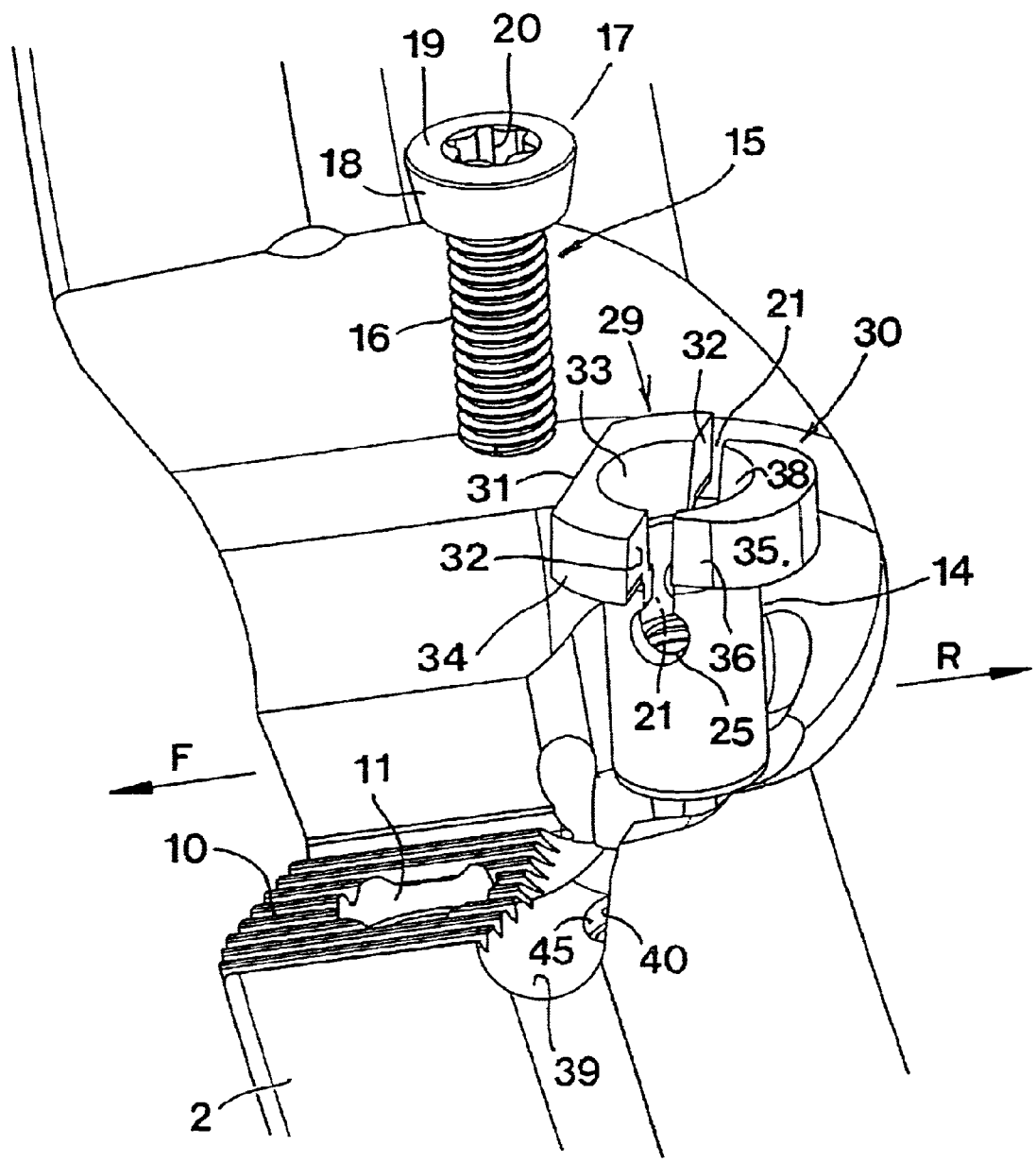
FIG. 3 is a perspective exploded view showing a sleeve, as well as a screw, which together form an adjusting mechanism that is insertable adjacent to a insert seat, whereby the insert seat and the sleeve are shown in the direction somewhat obliquely from behind.

In FIG. 3, numeral 10 generally designates an insert seat that in the shown embodiment example is in the form of a so-called serrated or connecting surface, which cooperates with a corresponding connecting surface on the underside of the cutting insert. Characteristic of such connecting surfaces is that they include straight ridges, spaced apart by grooves, having a cross-section-wise tapering shape, whereby the ridges in one of the connecting surfaces engage in the grooves in the other connecting surface and vice versa. A threaded hole 11 for a screw 12 (see FIG. 2) ports in the insert seat 10. The cutting insert 3 may be fixed by means of said screw, i.e. it is axially locked along the ridges and grooves of the connecting surface. Although it is preferred to clamp the cutting insert by means of only one screw, it is within the scope of the invention also possible to use other locking or clamping devices, such as clamps.

It should be pointed out particularly that the cutting insert, thanks to the serrated surfaces, does not require any radial support surface in order to support the inner side surface 7 of the cutting insert turned towards the center.

An adjusting mechanism 13 is arranged in the area behind the cutting insert and the insert seat. The mechanism will be described in more detail below, reference being made to FIGS. 3–9.

In the preferred embodiment shown, the adjusting mechanism 13 includes two components, viz. a sleeve 14 as well as a set screw 15. Said set screw includes a shank having a male thread 16 and an upper head 17 having an envelope surface 18 tapering downwards, which has a conical or rotationally symmetrical basic shape. A key socket 20, e.g. a star grip or hex socket grip ports in a plane upper end surface 19.

Figure 5:
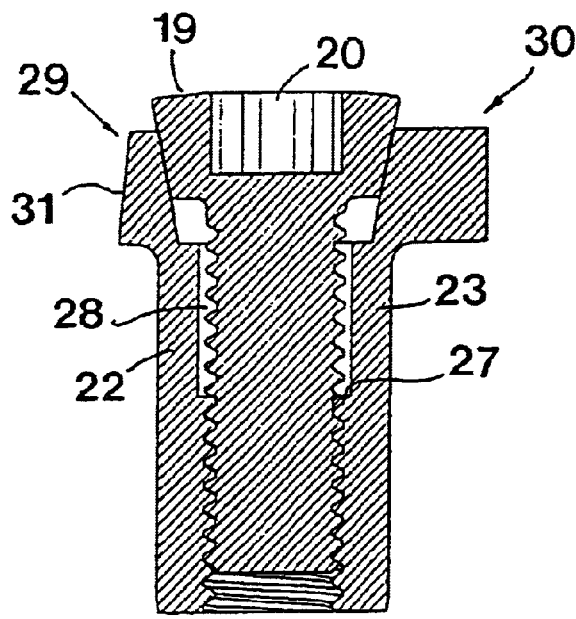
FIG. 5 is a section through the adjusting mechanism with the screw tightened in the sleeve.
Figure 6:
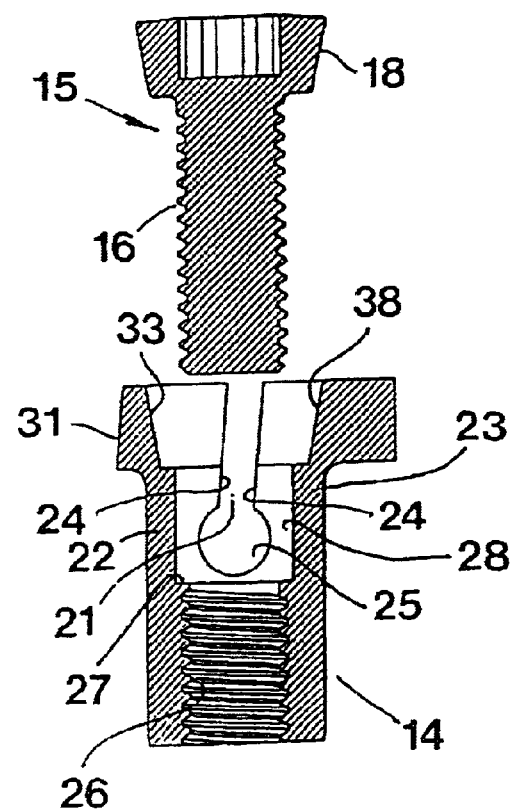
FIG. 6 is an analogous although exploded section showing the screw spaced apart from the sleeve.

Two slots 21 are formed in an upper half of the sleeve 14, which separate two elastically deflectable segments 22, 23 (see FIGS. 5 and 6). The ability of those segments to deflect is based on the material of the sleeve, which may consist of steel, having a certain inherent elasticity or flexibility. Each individual slot is delimited by two mutually parallel edge surfaces 24, which at the bottom transform into a through hole 25 having a larger diameter than the width of the slot. As is clearly seen in FIG. 6, each slot 21 is inclined in relation to the longitudinal axis of the sleeve as viewed in a direction perpendicular to that axis. The angle of inclination may be within the range of 5–10°.

In a lower, cylindrical part of the sleeve 14, a female thread 26 is formed into which the male thread 16 of the screw may be screwed. The female thread 26 transforms via a ring-shaped radial abutment surface 27 into an upper bore or space 28 that has a larger inner diameter than the female thread. This means that the part of the screw 15 that is not tightened into the female thread and that extends upwards from the abutment surface 27 may be elastically deflected (in the same way as the segments 22, 23).

The two deflectable segments 22, 23 have, at their upper ends, thickened material portions 29 and 30, respectively, which form collars or jaws on respective sides of the set screw. The first-mentioned jaw or collar 29 is generally arched as viewed in a direction parallel to the sleeve axis, and has a planar front surface 31, as well as two planar generally rearwardly directed rear pressure surfaces 32, which are spaced-apart by an essentially semi-circular rearwardly facing seat 33 for receipt of a part of the screw head 17. A partially cylindrical envelope surface portion 34 extends between the front surface 31 and each rearwardly directed pressure surface 32. As is shown in FIG. 5, the front surface 31 of the jaw 29 is inclined in relation to the longitudinal axis of the sleeve, more precisely in the direction obliquely upwards/rearwards in order to guarantee a complete surface abutment against the rear surface 6 of the cutting insert, which surface likewise is inclined. It will be appreciated that the term "front" relates to a direction F facing toward the outward adjustment direction of the cutting insert (i.e., to the left in FIG. 6), whereas the term "rear" relates to an opposite direction R. The forward direction is generally radial with respect to the sleeve 14 and axial with respect to the base body 2.

Figure 4:
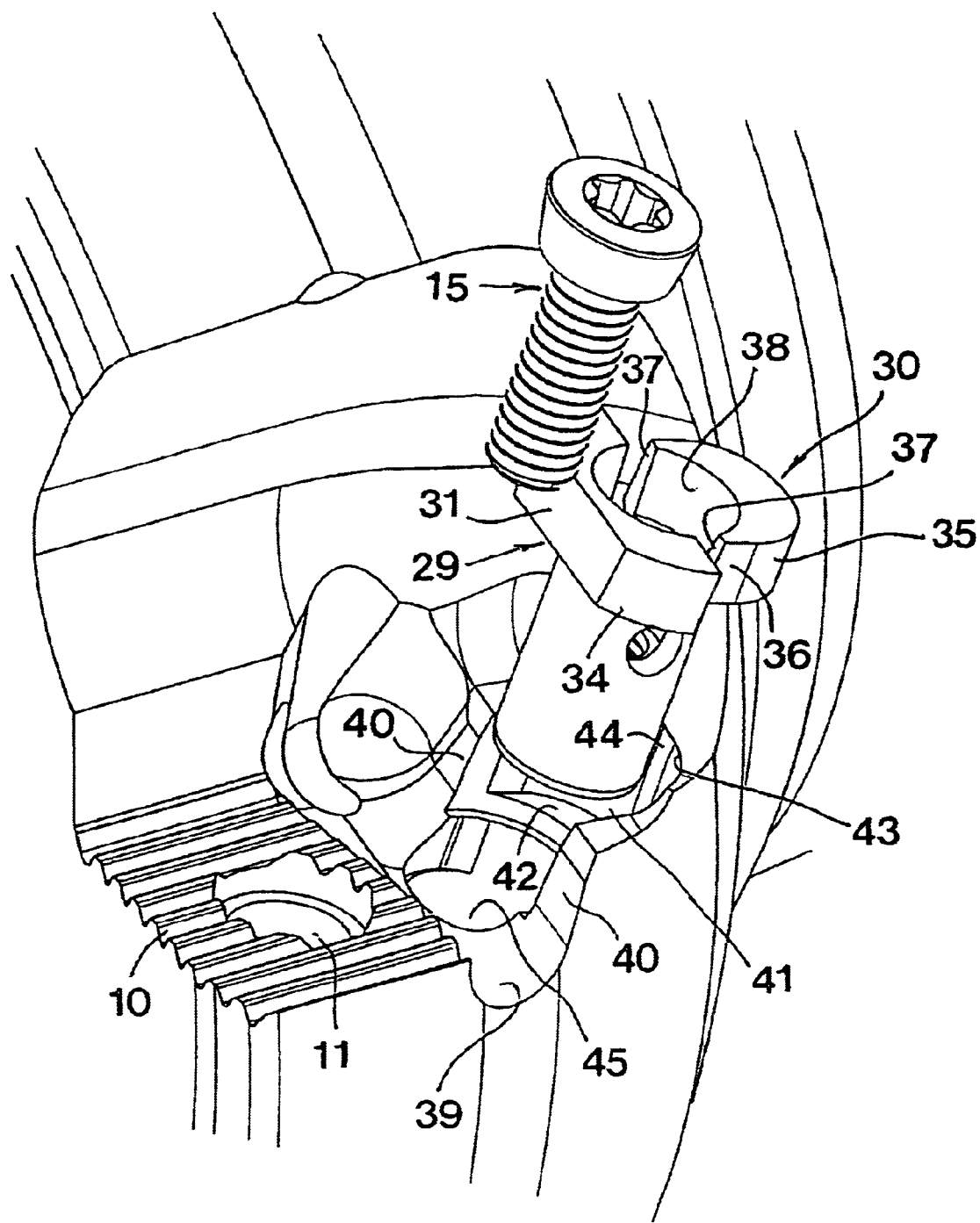
FIG. 4 is an analogous exploded view showing the insert seat together with the sleeve of the adjusting mechanism regarded obliquely from the front.

Also the second jaw or the collar 30 is generally arched, as viewed in a direction parallel to the sleeve axis (see FIGS. 3 and 4). As shown in FIG. 5, when the sleeve is sectioned in half by a section plane that extends parallel to the ridge teeth of the insert seat 10, the second jaw 30 is considerably more robust (thicker) than the first jaw 29 in the front-to-rear direction (left-right direction in FIG. 3). More precisely, the jaw 30 is defined by a convexly curved envelope surface 35, which at its front transforms into essentially planar side surfaces 36, which in turn transform into planar, comparatively thin forwardly facing edge surfaces 37 (FIG. 4). Said edge surfaces 37 are spaced apart by a central seat 38 that is opposite the envelope surface 35 and opens forwards, i.e., inward toward the sleeve axis. The seats 33, 38 are both partly conical (i.e., they converge in a downward direction) in order to conform to the conical envelope surface 18 of the set screw.

As is clearly seen not only in FIGS. 3 and 4, but also in FIG. 7, the second jaw 30 is considerably is shorter than the first jaw 29 in a direction perpendicular to the directions F, R, which means that the larger part of the two pressure surfaces 32 protrudes laterally outside the external side surfaces 36 of the jaw 30, as can be seen in FIGS. 4 and 7.

The sleeve 14 is mounted in a cylindrical hole 45 formed in the base body 2, (see FIGS. 4, 8 and 9), which hole ports adjacent to a flute 39 formed in the body 2 behind the insert seat 10 and having a curved shape. At the rear, said flute transforms into two parallel plane surfaces 40, which form secondary support surfaces against which the pressure surfaces 32 of the first jaw 29 may be pressed. Furthermore, in an area above the hole 45, a space 41 is formed in the base body 2, which space is delimited by a plane bottom surface 42 having a crescent-like contour shape, as well as a concavely curved upright surface 43. The rearwardly directed envelope surface 35 of the jaw 30 may be pressed against said surface 43. The contact between the envelope surface 35 and the surface 43 may, in practice, be realized in various ways. For instance, both the surfaces 35, 43 may be genuinely curved and have different radii in such a way that the radius of the surface 35 is smaller than of the surface 43. It is also feasible to form the surface 43 with a particular contact surface 44 (see FIG. 4) against which the surface 35 is pressed. In the example, this particular contact surface 44 forms a primary support surface and may be in the shape of a plane surface on a low back. As is seen in FIG. 9, the lower surface 46 of the jaw 30 is spaced-apart from the bottom surface 42 of the space 41.

Figure 9:
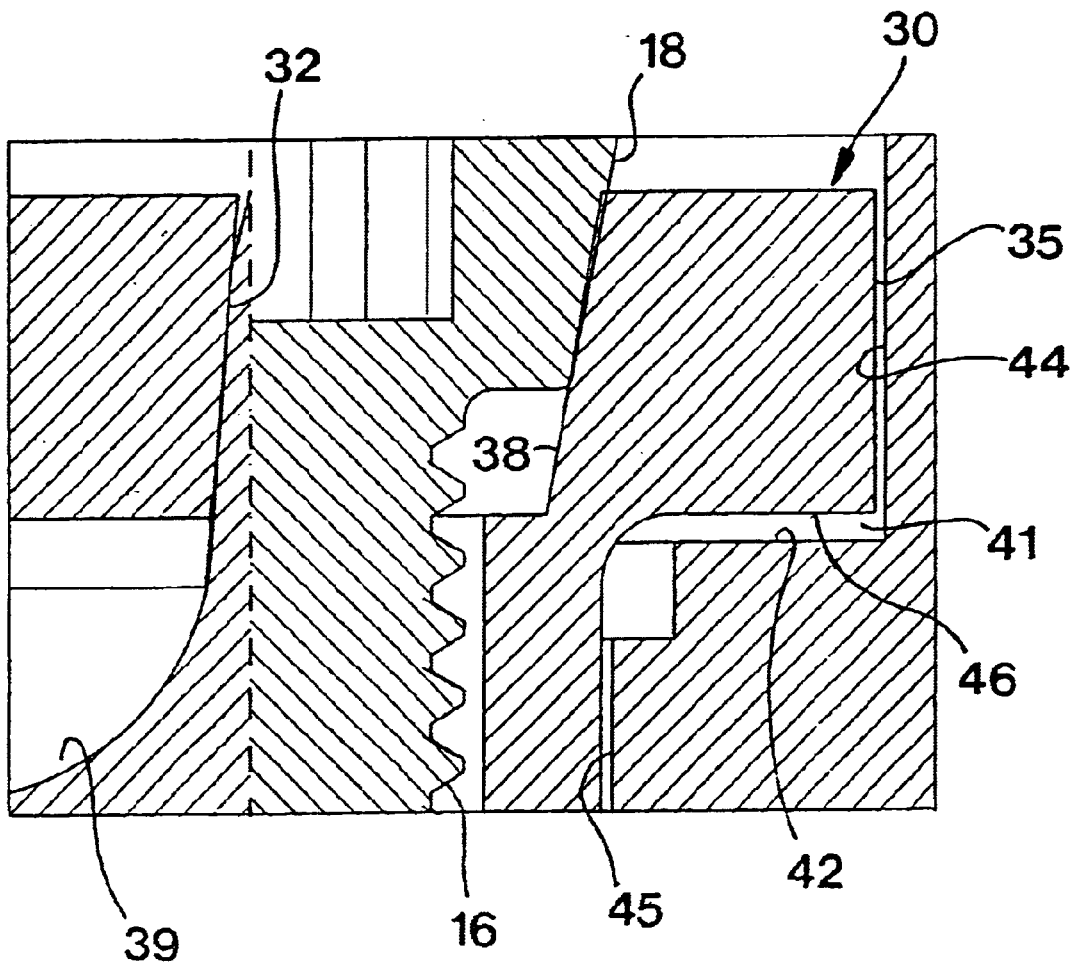
FIG. 9 is a detailed enlargement D in FIG. 8.

In FIG. 9 is indicated how the conical envelope surface 18 on the head of the set screw has a somewhat larger cone angle than the analogous, interior cone surfaces 38 and 33 in the jaws 30 and 29, respectively.

In FIG. 8 is shown how the sleeve 14 is fixed in the hole 45 by the lower end of the sleeve being forced into the hole with a press fit at the interface 47.

The terms "upper" and "lower", respectively, as used in the description and claims are related to the tool as it is shown in the drawings. However, in practice, the tool may be oriented in an arbitrary way in the space, and therefore it should be appreciated that the terms are used only in order to provide conceptual simplicity.

Function and Advantages of the Tool According to the Invention

The adjusting mechanism 13 should be mounted in the base body 2 before a respective cutting insert is installed in the insert seat 10. The assembly is carried out by pressing the sleeve 14 with a press fit 47 into the hole 45 by means of a suitable tool so that it becomes fixed in position. During the axial pressing-in of the sleeve into the hole 45, the two secondary support surfaces 32 of the first jaw 29 which thanks to the inclination of the slots 21 in relation to the center axis of the sleeve (shown in FIG. 6), will be pressed with a certain prestress against the two secondary support surfaces 40 in the base body. In practice, this means that the jaw 29 is already initially kept abutted in close contact against the support surfaces 40, whereby the front surface 31 of the jaw will present an immovable rear support surface which defines a fixed basic support position for the cutting insert 3.

When the sleeve has been mounted in the base body, the set screw 15 may be tightened, more precisely so far that the screw stays in the sleeve, but without the pressure surface 35 of the second jaw 30 contacting the primary support surface 44 (see FIG. 9). In this state, which constitutes a first functional state for the adjusting mechanism, the cutting insert 3 may be mounted in the insert seat 10. This takes place by placing the cutting insert in the insert seat and pushing it rearwards (to the right in FIG. 8) so that the rear surface 6 thereof is pressed against the front surface 31 of the jaw 29 (see FIG. 2). After this, the screw 12 is fastened in the threaded hole 11, whereby the screw, in a known way per se, brings the cutting insert to be resiliently pressed against the jaw 29. Here, it should be pointed out that the screw 12 already at the mounting stage is tightened with a full torque.

In this first functional state, the cutting insert assumes a basic position in which the thrust loads acting on the cutting insert are transferred to the base body only via the first jaw 29, which is in close contact with the support surfaces 40 at the same time as the cutting insert is in close contact with the front surface 31. By manufacturing the first jaw 29 of the sleeve with a good dimensional accuracy in respect of the distance between the front surface 31 and the two rearwardly directed pressure surfaces 32, the front cutting edge 8 of the cutting insert may in said basic position be "coarse set" to a fairly good accuracy, e.g. within the range of 1–2/100 mm (0.01–0.02 mm); something which is fully satisfactory for many practical machining situations. In the first functional state, the second jaw 30 is inactive so far that the rearwardly turned pressure surface 35 thereof is not kept operatively pressed against the primary support surface 44. This means, among other things, that no thrust loads are transferred to the second jaw 30 or to the set screw 15 in that the thrust loads are directly transferred to the base body via the first jaw 29. In this state, which is illustrated on an enlarged scale in FIG. 9, the gap between the pressure surface 35 of the jaw 30 and the primary support surface 44 may amount to 0.01–0.1 mm or thereabouts.

If the need should arise to fine-adjust the cutting insert and the cutting edge 8, the following additional procedure should be followed. The set screw 15, the conical head 17 of which acts as a wedge element between the jaws 29, 30, is screwed-in additionally into the sleeve. In a first stage during said additionally tightening of the set screw, the first jaw 29 will remain exactly as in the above-described state, i.e. with the front surface 31 abutting against the cutting insert and with the rearwardly directed pressure surfaces 32 abutted in close contact against the secondary support surfaces 40. However, the second jaw 30 and its pressure surface 35 will move progressively toward the primary support surface 44, more precisely by the wedge action of the screw head against the conical interior 38 of the jaw 30 which gradually deflects the segment 23 in the direction outwards from the center of the sleeve. When the pressure surface 35 is in contact with the support surface 44 and takes support from the same, continued tightening of the set screw will also cause the first jaw 29 to move radially outwards (i.e., forwardly) from the center of the screw. This is made possible by the fact that the wedge force from the head of the set screw overcomes the force with which the screw 12 holds the cutting insert in the insert seat, as described in greater detail below. The operative engagement of the pressure surface 35 of the second jaw 30 against the support surface 44 during the first step of the tightening of the set screw can be carried out by the part of the threaded shank of the screw that is present above the abutment surface 27 being deflected somewhat laterally during the simultaneous turning of the screw. In an analogous way, elastic deflection of the upper part of the screw is allowed also when the pressure surface 35 has been pressed operatively against the support surface 44 and the first jaw 29—during continued tightening of the screw—is distanced from the support surfaces 40. By adjusting a number of different factors in a suitable way, mainly the conicity of the screw head 17 and the thread pitch of the set screw, said movement of the jaw 29 and the cutting insert in the forward direction outwards from the support surfaces 40 may take place in very fine steps. Thus, tests made have shown that the setting may be effected with an accuracy of approximately 1/1000 mm.

Due to the fact that the insert screw 12 during the above-mentioned fine-adjusting is still fully tightened, the frictional forces between the intermeshed serrated surfaces in the insert seat 10 and the bottom side of the cutting insert become comparatively large. Theories that form the basis for the present invention suggest that the cutting insert, during the fine adjustment thereof and movement in the forwards direction (i.e. parallel to the axis C), subject the material in the interengaging surface zones of the serrated insert seat 10 to something that could be termed "elastic shear effect", which manifests itself in that the cutting insert is subjected to a certain tendency to return in the direction of the aforementioned basic position if the set screw 15 were to be subsequently rotated in the opposite direction of rotation, i.e. is loosened. This has the advantage that the cutting insert—in spite of the strong clamping thereof by means of the insert screw 12—gets a certain capability to move a distance rearwards (e.g., 1/1000 mm or more) if the insert, during the fine-adjusting operation were unintentionally pushed out somewhat too far in relation to a desired fine-adjusting position by merely loosening the set screw.

A substantial advantage of the tool and the adjusting mechanism thereof according to the invention is that all cutting inserts in the tool may be adjusted into an acceptable basic position without the set screws for all cutting inserts having to be finely manipulated. This is particularly advantageous in connection with such tools that include many cutting inserts, and also demand frequent insert exchanges, because manual fine-adjusting operations are always time-consuming. If the need for fine adjustment arises, the adjusting mechanism is activated, more precisely by tightening the set screw 15 in the above-described manner.

Another advantage is that the train of force from the individual cutting insert to the base body in the normal case (i.e., when the insert is in the "basic" position) only penetrates the first jaw, which is geometrically simple. In other words, neither the set screw nor the second jaw is exposed to thrust loads from the cutting insert except when the adjusting mechanism has been activated for fine adjustment of the cutting insert. This involves, among other things, the advantage of increased service life of the tool and the adjusting mechanisms thereof.

Feasible Modifications of the Invention

The invention is not solely limited to the embodiment described above and shown in the drawings. Thus, it is feasible to use wedge elements other than a conical head on a set screw. Thus, in order to carry out the required separation of the two jaws which have different widths, a cross-section-wise quadrangular wedge that is only axially movable by means of a suitable clamping device may be used. In other words, the wedge element does not need to be rotatable in the way that characterizes a screw.

Moreover, the two jaws on both sides of the wedge element need not be integrated in a common sleeve or the like. Thus, the jaws may consist of separate elements, which are kept fixed in the base body on both sides of a wedge element.

Furthermore, it should be pointed out that the invention does not require that the adjusting mechanism include only one wedge element and a jaw arranged between the wedge element and the cutting insert, which jaw has two pressure surfaces for cooperation with two secondary support surfaces on both sides of a thinner jaw, as has been described above. Alternatively, it is feasible to provide the first jaw with only one pressure surface for cooperation with a secondary support surface in the base body, whereby the base body has one or more primary support surfaces for cooperation with equally many pressure surfaces on the second jaw.

It is also possible to use more than one wedge element in the adjusting mechanism.

Although the two seats 33, 38 which together form a hollow space have a rotationally symmetrical shape, more precisely a conical, basic shape, for receipt of the conical head of the set screw, it is feasible to form the seats so that the hollow space has an oval cross-section shape instead of a genuine circular one.

Although the present invention has been described in connection with a preferred embodiment thereof, it will be appreciated by those skilled in the art that additions, deletions, modifications, and substitutions not specifically described may be made without departing from the spirit and scope of the invention as defined in the appended claims.

What is claimed is:

1. A tool for chip removing machining comprising:
a base body presenting an insert seat adapted to receive a cutting insert, the base body including first and second fixed support surface structures disposed adjacent to the seat; and
an insert adjusting mechanism disposed on the base body adjacent to the seat, the adjusting mechanism including first and second jaws and a movable wedge member positioned between the jaws for spreading the jaws away from one another by a selected distance;
the first jaw including a front surface facing in a first direction toward the seat, and a first pressure surface structure facing in a second direction generally opposite the first direction, the front surface adapted to engage a cutting insert and define a support position therefor;
the second jaw including a second pressure surface structure facing generally in the second direction,
the jaws being positionable in a first position wherein the first pressure surface structure engages the first support surface structure, and the second pressure surface structure is spaced from the second support surface structure, wherein the front surface of the first jaw defines a basic support position adjacent the seat;
the jaws being positionable in a second position by being spread apart by the wedge member, wherein the second pressure surface structure engages the second fixed support surface structure and displaces the first jaw in the first direction, wherein the front surface of the first jaw defines an adjusted support position.

2. The tool according to claim 1 wherein the wedge element comprises a conical part of a screw.

3. The tool according to claim 2 wherein the adjusting mechanism comprises a sleeve which includes first and second elastically deflectable segments separated by slots; the first and second segments forming the first and second jaws, respectively.

4. The tool according to claim 3 wherein the first support surface structure comprises two first support surfaces defined by forwardly facing surfaces of respective ones of the slots, the first support surfaces being inclined in a direction urging the first jaw in the first direction as the first jaw is installed in the base body.

5. The tool according to claim 3 wherein the screw includes a male thread engaging a female thread disposed in a lower portion of the sleeve, the conical part of the screw defined by a screw head having a key socket formed therein.

6. The tool according to claim 1 the adjusting mechanism comprises a sleeve which includes first and second elastically deflectable segments separated by slots; the fist and second segments forming the first and second jaws, respectively.

7. The tool according to claim 1 wherein the first support surface structure comprises two first support surfaces spaced apart in a direction extending laterally of the first direction, the first support surfaces spaced apart by a recess of the base body, with the second support surface structure forming a rear wall of the recess; the first pressure surface structure comprising two first pressure surfaces engaging the two first two support surfaces, respectively.

8. The tool according to claim 7 wherein the second jaw is shorter than the first jaw in a direction extending perpendicularly relative to the first direction, the second jaw disposed in the recess.

9. The tool according to claim 8 wherein the first jaw comprises a first collar on which the front surface is deformed, the front surface being planar, the first collar including a concave surface facing in the second direction, the two first pressure surfaces being planar and disposed at opposite ends of the concave surface, the wedge member engaging the concave surface; the second jaw comprising a second collar on which the second pressure surface structure is disposed; the second pressure surface structure being generally arch-shaped as viewed in a direction parallel to a direction of wedge member movement; the second collar including a concave surface facing in the first direction and engaged by the wedge member.

10. The tool according to claim 1 wherein the insert seat includes a surface having spaced-apart ridges extending parallel to the first direction, each ridge having a tapered cross-section.

11. A method for chip removing machining, the method utilizing a base body presenting an insert seat adapted to receive a cutting insert, the base body including first and second fixed support surface structures disposed adjacent to the seat; and an insert adjusting mechanism disposed on the base body adjacent to the seat, the adjusting mechanism including first and second jaws and a movable wedge member positioned between the jaws for spreading the jaws away from one another by a selected distance; the first jaw including a front surface facing in a first direction toward the seat, and a first pressure surface structure facing in a second direction generally opposite the first direction, the front surface adapted to engage a cutting insert and define a support position therefor; the second jaw including a second pressure surface structure facing generally in the second direction, the method comprising the steps of:

A) positioning the jaws in a first position wherein the first pressure surface structure engages the first support surface structure, and the second pressure surface structure is spaced from the second support surface structure, the front surface of the first jaw defining a basic support position for the insert, and B) actuating the wedge member to spread apart the jaws, to cause the second pressure surface structure to engage the second fixed support surface structure and displace the first jaw in the first direction, while maintaining engagement between the first pressure surface structure and the first support surface structure, wherein the front surface of the first jaw is displaced to define an adjusted support position.

\* \* \* \* \*